United States Patent [19]
Anderson

[11] Patent Number: 5,991,601
[45] Date of Patent: *Nov. 23, 1999

[54] PERSONAL INTERCOMMUNICATION PURCHASE AND FULFILLMENT SYSTEM

[76] Inventor: John R. Anderson, 1200 N. Pine Ave., Arlington Heights, Ill. 60004

[ * ] Notice: This patent is subject to a terminal disclaimer.

[21] Appl. No.: 09/224,750

[22] Filed: Jan. 4, 1999

Related U.S. Application Data

[63] Continuation of application No. 08/696,373, Aug. 13, 1996, Pat. No. 5,857,156
[60] Provisional application No. 60/016,143, Apr. 24, 1996.

[51] Int. Cl.⁶ ........................................... H04B 7/26
[52] U.S. Cl. ........................................... 455/38.4; 455/564
[58] Field of Search ................................ 455/4.1, 4.2, 5.1, 455/31.2, 31.3, 38.1, 38.4, 45, 66, 507, 564, 517, 186.1; 348/7, 9, 10; 340/539, 905, 825.44, 825.26; 235/462, 472, 492

[56] References Cited

U.S. PATENT DOCUMENTS

| | | |
|---|---|---|
| 5,393,965 | 2/1995 | Bravman et al. . |
| 5,416,310 | 5/1995 | Little . |
| 5,452,356 | 9/1995 | Albert . |
| 5,479,441 | 12/1995 | Tymes et al. . |
| 5,481,255 | 1/1996 | Albert et al. . |
| 5,499,020 | 3/1996 | Motohashi et al. . |
| 5,555,446 | 9/1996 | Jasinski . |
| 5,557,541 | 9/1996 | Schulhof et al. . |
| 5,675,139 | 10/1997 | Fama . |
| 5,708,262 | 1/1998 | Goldman et al. . |
| 5,857,156 | 1/1999 | Anderson ................ 455/38.1 |

*Primary Examiner*—Thanh Cong Le
*Attorney, Agent, or Firm*—Wallenstein & Wagner, Ltd.

[57] ABSTRACT

An electronic system for purchasing an item has at least one home station and at least one remote device (56). More particularly, the present invention is directed to a method or means for purchasing the item by entering a code into the remote device (56). The remote device (56) of the present invention is in the form of a pager 10 and/or a radio.

3 Claims, 7 Drawing Sheets

2 WAY NARROWBAND PCS PAGER WITH BAR-CODE SCANNER

2 WAY NARROWBAND
PCS PAGER WITH
BAR-CODE SCANNER

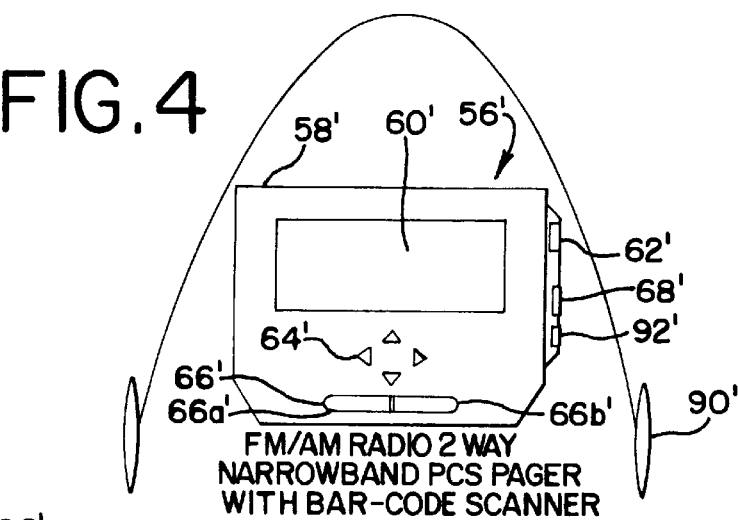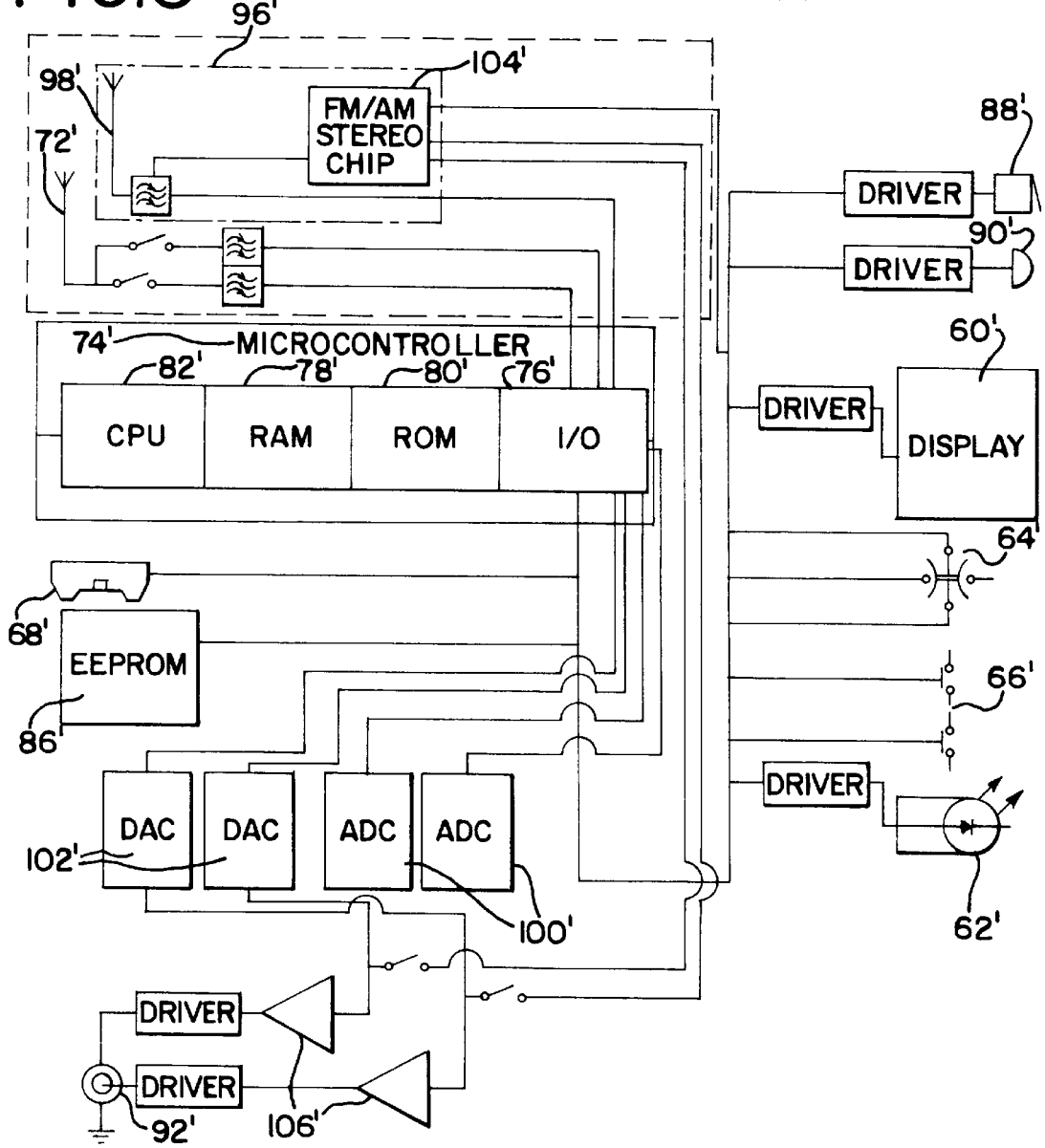

FM/AM RADIO 2 WAY
NARROWBAND PCS PAGER
WITH BAR-CODE SCANNER
&
PCMCIA SRAM/FLASH
RAM DOWNLOAD MODULE

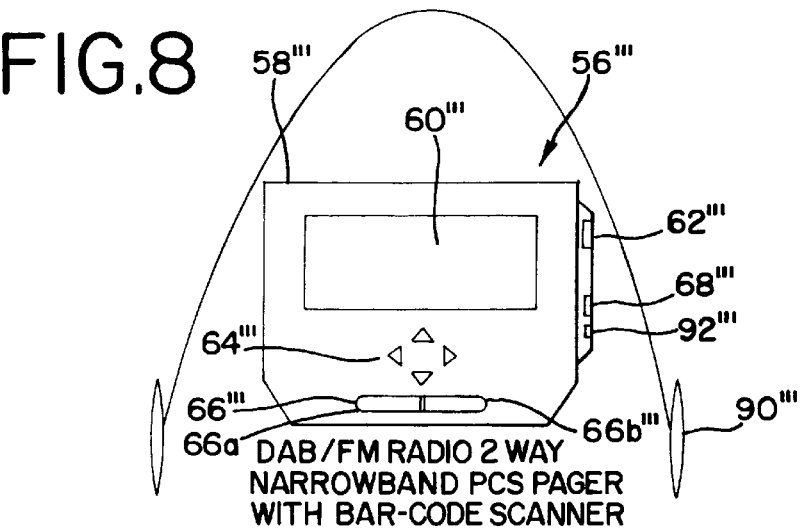
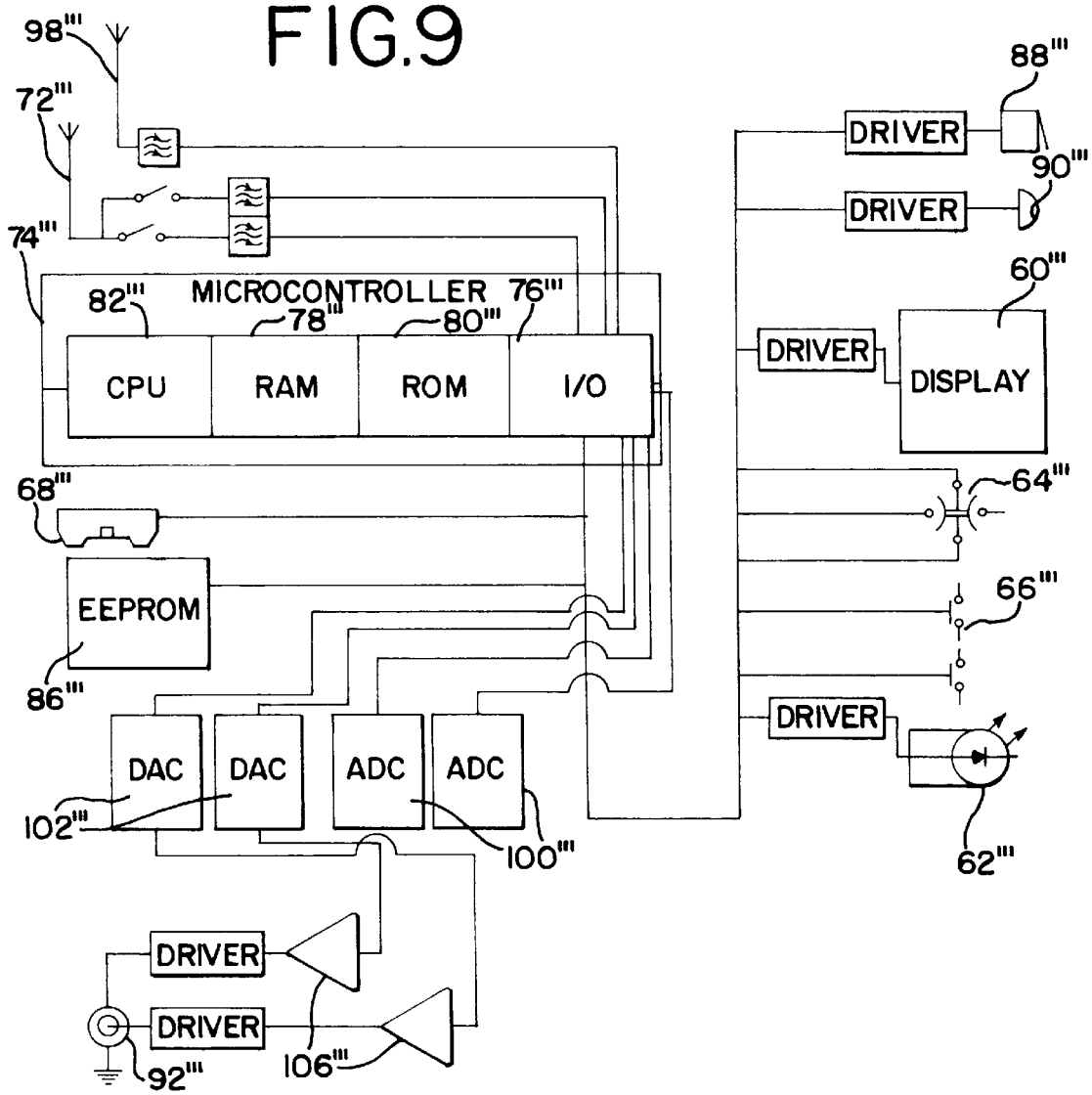

DAB/FM RADIO 2 WAY NARROWBAND PCS PAGER WITH BAR-CODE SCANNER & PCMCIA SRAM/FLASH RAM DOWNLOAD MODULE

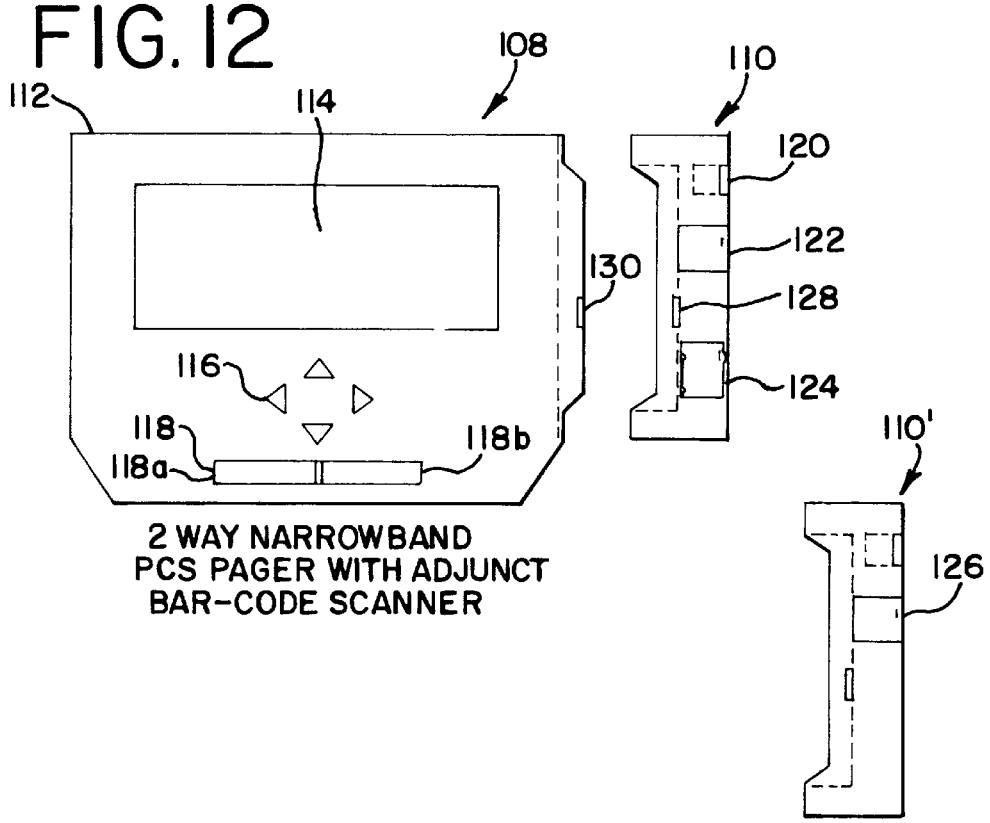
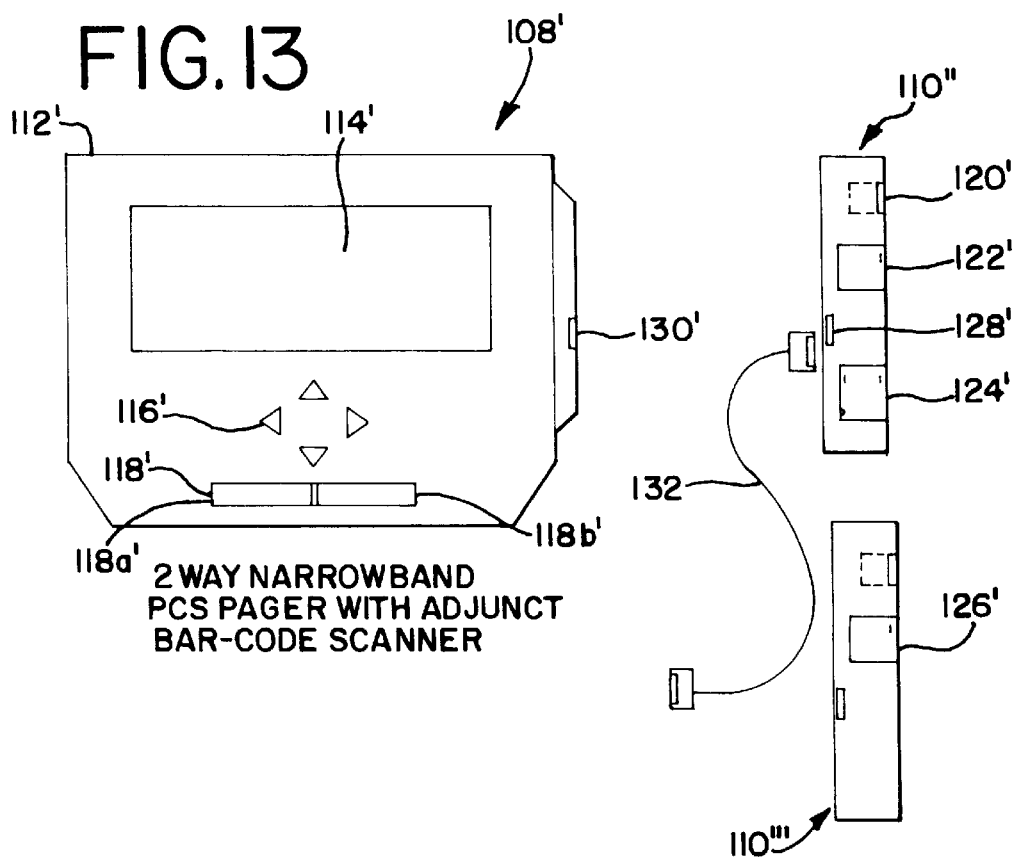

PERSONAL INTERCOMMUNICATION PURCHASE AND FULFILLMENT SYSTEM

CROSS REFERENCE TO RELATED APPLICATION

This application is a continuation of U.S. application Ser. No. 08/696,373, filed Aug. 13, 1996, U.S. Pat. No. 5,857, 156 claims the benefit of U.S. Provisional Application No. 60/016,143, filed Apr. 24, 1996.

TECHNICAL FIELD

The present invention relates generally to an electronic system for purchasing an item where the system has at least one home station and at least one remote device. More particularly, the present invention is directed to a method of purchasing an item by entering an item code into the remote device and transmitting the item code to the home station. The remote device of the present invention is in the form of a pager and/or a radio.

BACKGROUND OF PRIOR ART

Consumers, on average, make purchases at three retail stores per week and have little time for shopping elsewhere. The various retail stores at which consumers make purchases include outlet stores, shopping centers, hardware stores, grocery stores, drug stores, clothing stores and shoe stores. Consumers often identify items they wish to purchase while going about their daily routines rather than when they are shopping. Thus, when a consumer encounters items which he wishes to purchase, it is often inconvenient and/or impossible to search for, much less purchase, these items. Without the ability to purchase these items at the time the consumer is motivated to make the purchase, these purchases are unlikely. Therefore, it would be advantageous for merchants and advertisers to make a sale at the exact time their product is shown or advertised to the consumer. Consumers, on the other hand, desire to make purchases with minimal effort, time and dollars.

In addition to the disadvantages listed above, Nielsen, consumer groups, advertisers and marketers require a faster and more precise method of obtaining accurate measurements to quantify and qualify purchases and buyer demographics; retailers desire immediate transactions and order fulfillment to reduce inventory and hasten consumer purchasing (check out) processes; and buyers desire having immediate access to information concerning their financial accounts.

SUMMARY OF THE INVENTION

The present invention is directed to a distribution and fulfillment system facilitating consumer search and procurement mechanisms on an aggregated scale.

The present invention, referred to as a Personal Intercommunication Purchase and Fulfillment System (PIPFS), is comprised of several components and logic systems. Fundamental and unique to the system is the buyer's ability to effortlessly execute a transaction based on his or her needs and impulse buying patterns.

The present invention is also used to collect and store information regarding products to be purchased and the purchasing preferences of various buyers. This information is used to support buyers' preference portfolios, to track previous purchases, to browse selections, and to offer suggestions to the consumer regarding similar types of products. The system is buyer determined. Thus, information regarding a buyer's purchasing patterns or habits is stored in the system and is available for future use to suggest other products to the buyers based on their purchasing patterns, i.e., to create joint purchase complementaries.

Joint purchase complementaries provide buyers with the ability to purchase products from a single source. The present system can perform complementary searches to suggest related products to the consumer based on a buyer's previous purchases. Complementary searches afford buyers greater flexibility and depth of knowledge when purchasing related products. When combined with the economies of scale in large networks, buyers have access to remote selections not normally available. This increases the number of purchases made by customers, as well as incremental revenue gains.

Consumer switching tendencies or costs are often based on geographic and convenience considerations that are difficult for retailers to control. The present PIPFS leapfrogs this boundary by making it possible for consumers to make purchases quickly at anytime and anywhere. Thus, consumers need not seek alternative sources because the PIPFS is cost driven, friendly, fin, and immediately accessible.

According to a first aspect of the present invention, an electronic system having at least one home station and at least one remote device is used for purchasing an item. Initially, an item code representing the item to be purchased is entered into and displayed at the remote device and is transmitted from the remote device to the home station. Upon receipt of the item code, the home station transmits a home confirmation signal acknowledging the receipt of the signal from the home station to the remote device. An alarm means acknowledges the receipt of the home confirmation signal at the remote device. The home confirmation signal is displayed at the remote device, and a remote confirmation signal is transmitted from the remote device to the home station.

According to a second aspect of the present invention, an electronic system having at least one home station and at least one remote device is used for purchasing either an item containing recorded music playing on a radio signal at a specific frequency or an item advertised on the radio signal at the frequency. The radio signal is received within the remote device and transmitted to a speaker. The frequency of the radio signal is entered into the remote device and transmitted to the home station. Once the frequency is received at the home station, the item containing either the recorded music playing on the radio signal or the item advertised on the radio signal is located and ordered for the consumer.

Other features and advantages of the invention will be apparent from the following specification taken in conjunction with the drawings.

BRIEF DESCRIPTION OF THE DRAWINGS

In order that the present invention may be more fully understood, it will now be described by way of example, with reference to the accompanying drawings in which:

FIG. 4 is a front elevation view of a second embodiment of a remote device;

FIG. 5 is a schematic drawing of the remote device of FIG. 4;

FIG. 8 is a front elevation view of a fourth embodiment of a remote device;

FIG. 9 is a schematic drawing of the remote device of FIG. 8;

FIG. 12 is a front elevation view of a sixth embodiment of a remote device; and, FIG. 13 is a front elevation view of a seventh embodiment of a remote device.

DETAILED DESCRIPTION

Figure 1:
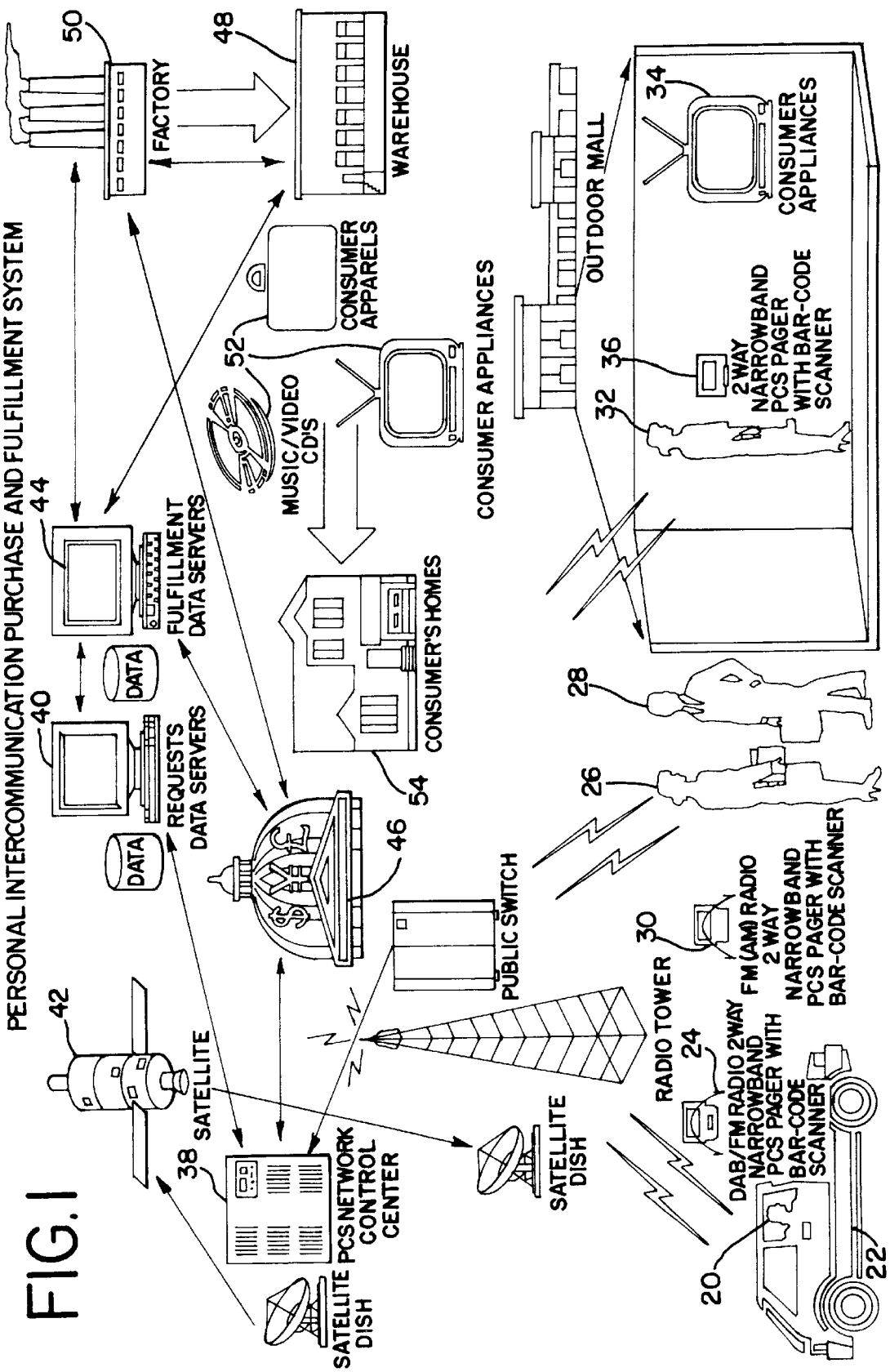
FIG. 1 is an overall diagram of an electronic system for purchasing an item in accordance with the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. device; and, FIG. 1 represents an overall view of the electronic system for purchasing an item, known, and hereinafter referred to, as the Personal Intercommunication Purchase and Fulfillment System (PIPFS). Various scenarios using a remote device to enter a purchase order into the PIPFS are also shown in FIG. 1. In the first scenario, a consumer 20 is traveling in an automobile 22 and hears a song or a radio advertisement of a product he would like to purchase. The consumer 20 enters the advertiser's code or the radio station's call letters into a remote device 24.

In another scenario, a consumer 26 sees merchandise on the street or in possession of another person 28 (most likely a friend or acquaintance). The consumer 26 scans the product's bar-code identification into the remote device 30 and transmits this information over the network in the PIPFS. The merchandise could also be scanned from an ad on a T.V. or from printed media.

In a third scenario, a consumer 32 is evaluating a product 34 at a retail outlet display/showroom. If the consumer 32 wishes to purchase the product, she can scan its bar-code with her remote device 36, and the information is transmitted to the PIPFS.

Once the information is transmitted by the remote device 24, 30, 36 it is channeled across the public network to the home station or Personal Communication Services Network Control Center (PCS NCC) 38. The PCS NCC 38 receives the required information and directs it to the request data servers 40. The request data servers 40 cross reference their databases for up-to-date product and pricing information, store the requested information in their databases, and reply back to the PCS NCC 38 with valid product information and a request for order delivery and purchase confirmation.

The PCS NCC 38 relays the information concerning product availability, consumer search requests, complementaries, etc. to the satellite 42, which then relays the data to the consumer's remote device 24,30,36. The consumer confirms the order with his or her remote device 24, 30, 36, and a remote confirmation signal is fed back to the request data servers 40 and transferred to fulfillment data servers 44.

The fulfillment servers 44 relay all necessary financial transaction information to the appropriate banks and/or credit card companies 46 that complete the remaining credit and debit transactions for the company and its affiliates. As a result, consumers can use one of three types of payment systems: (1) a charge to a consumer's credit card (the credit card numbers being on file with the system); (2) electronic checks or "wallets" from an account with a bank; or, (3) an electronic commerce (e-cash) system (transmitted and cleared at the time of the transaction).

E-cash is the evolutionary progression of money in the form of physical "atoms" to electronic bits. E-cash systems are token based systems where a consumer stores tokens on a memory device, such as a standard credit card size format established by the Personal Computer Memory Card Interface Association (PCMCIA). E-cash is withdrawn from a bank over the network in a way similar to withdrawing physical cash from an ATM. In order to spend e-cash, tokens are exchanged for the products to be purchased.

The fulfillment servers 44 send order and delivery information to the warehouses 48. The fulfillment servers 44 and/or warehouses 48 send inventory information back to the factories 50 for input into production schedules. Factories 50 ship their merchandise to the warehouses 48, and the purchased products 52 are delivered to the consumer's home 54.

Consumers can query their account information and order status through the PCS NCC 38, the request data servers 40, or the fulfillment data servers 44.

Figure 2:
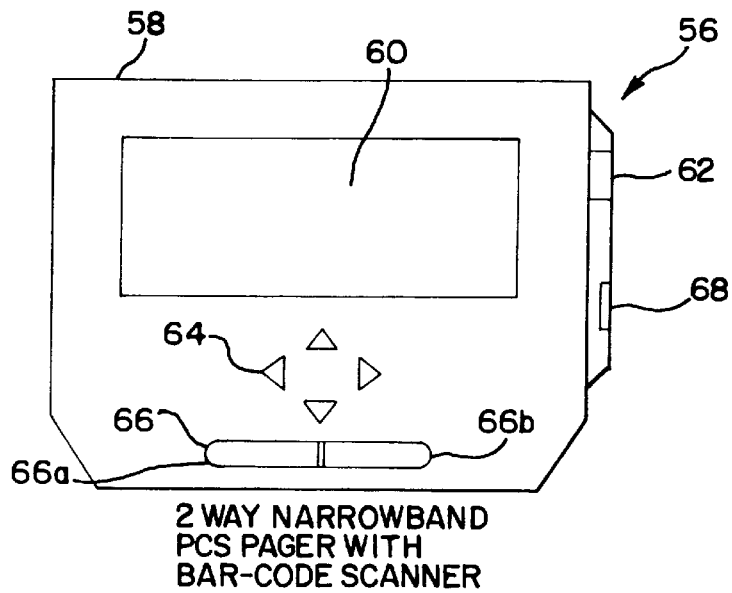
FIG. 2 is a front elevation view of one embodiment of a remote device made in accordance with the present invention.

FIG. 2 is a front elevation view of one embodiment of a remote device 56 of the electronic system for purchasing an item. The remote device 56 is in the form of a two-way narrowband personal communication services (PCS) pager with a bar-code scanner. The components of the remote device or pager 56 are encased in a shock resistant durable ceramic or plastic shell 58. Messages, menus, commands, files, and configuration settings are viewed in the Liquid Crystal Display (LCD) 60 of the remote device 56. Bar-code information is scanned using a fully integrated reflective sensing module 62 containing a light emitting diode (LED) emitter and photo diode which generates a current as its output signal. A four-way switch 64 is used for controlling cursor movement in the LCD 60. Left and right programmable select buttons 66 are used to control the remote device 56. One button 66a is for the menu, file, message, command, and alphanumeric input selections while the other button 66b functions as an escape mechanism. so the buttons 66 can be programmed to perform either function. This is an ergonomic design to support left- or right-hand preference people. An RS232 connection 68 is supplied to support data transfer and back-up storage options.

Figure 3:
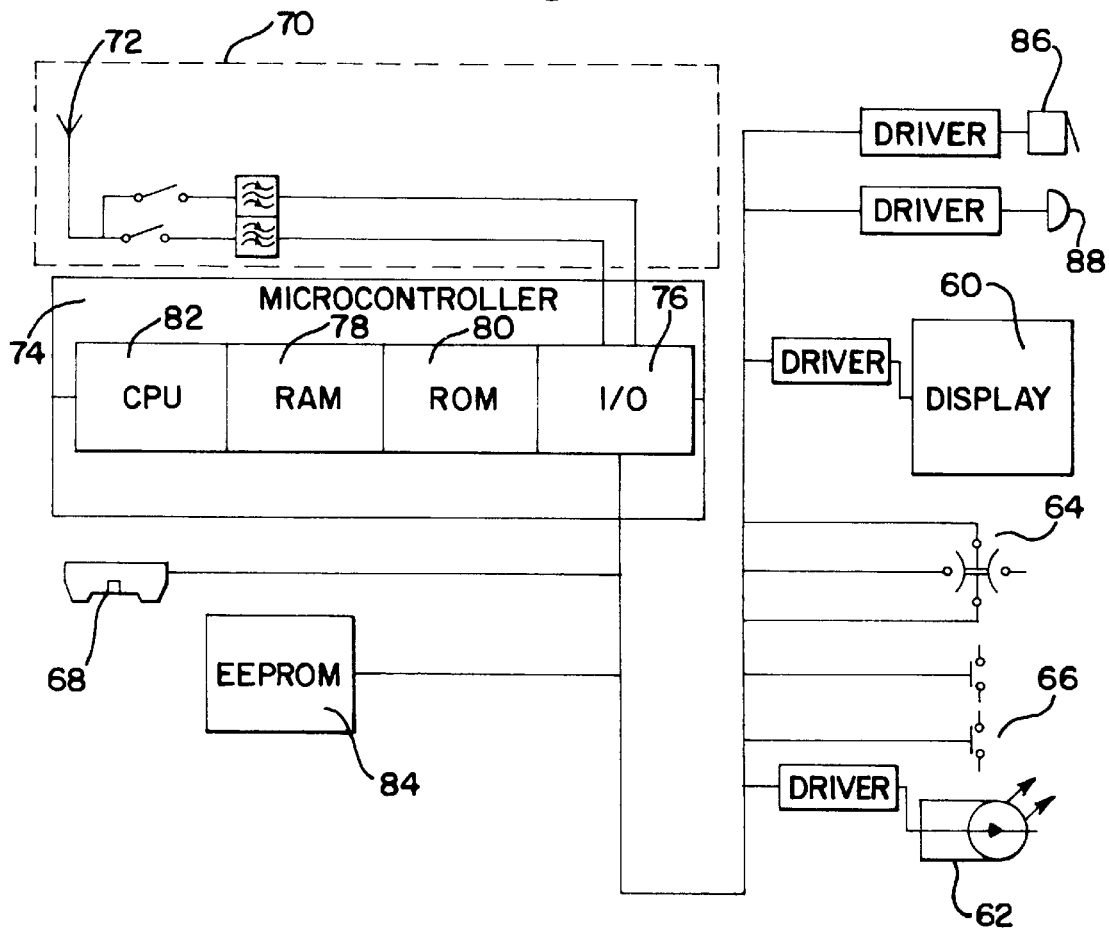
FIG. 3 is a schematic drawing of the remote device of FIG. 2.

FIG. 3 is a schematic drawing of the remote device of FIG. 2, and represents the internal electrical function diagram flow of the remote device 56. The receiver/transmitter encoder/decoder assembly 70 includes an antenna 72. The assembly 70 defaults to the receiver position and switches to the transmitter when requested from the microcontroller 74. The receiver operates in the 930–931 MHz and 940–941 MHz frequency bands with channel spacing at 25 kHz. The transmitter operates in the 901–902 frequency bands with channel spacing at 12.5 kHz. This spectrum was recently allocated by the Federal Communication Commission (FCC).

Preferably, the receiver's bit rate is 6400 bps and signaling is 4 level frequency shift key (FSK) at 6400 bps. At this bit rate, the receiver's paging sensitivity is 14 micro-V/m, frequency deviation is +/−2400 Hz binary, +/−800 Hz and +/−2400 Hz for 4 level; image rejection is 35 dB and spurious rejection 40 dB; selectivity is 60 dB at +/−50 Khz; frequency stability is 1 parts per minute (PPM) from −10 to +50 degrees Celsius and performs 1 MHz blocking at 80 dB. The transmitter's bit rate is 9600 bps and signaling is 4 level FSK at 9600 bps; frequency deviation is +/−800 Hz and +/−2400 Hz for 4 level. The emissions meet Narrowband PCS FCC specifications. Power into the antenna 72 is 1W and frequency stabilization 1 PPM.

The transmitter/receiver unit 70 interfaces with the bus module in the Serial I/O portion 76 of the microcontroller 74. The module is a two-wire, bidirectional serial bus which provides a simple and efficient means of data exchange between devices; it is compatible with the inter-integrated circuit (I2C) bus standard. The maximum data rate of 100 Kbit/s can be reached at system clock speeds of 3.0 MHZ and above. The serial bit clock frequency of the bus is programmable and ranges from 3830 Hz to 757 Khz for a 16.67 MHz internal operating frequency. The system is a true multi-master bus including collision detection and arbitration to prevent data corruption (when two or more masters attempt to control the bus simultaneously). The bus interface uses serial data bus (SDA) and serial clock bus (SCL) signals for data transfer. All devices connected to the bus interface must have open drain or open collection output; and a logic AND function is implemented in both lines with pull-up resistors. The bus is software programmable for one of 32 different serial clock frequencies. The bus has a software selectable acknowledge bit; interrupt driven byte-for-byte data transfer; arbitration-lost driven interrupt with automatic mode switching from master to slave; calling address identification interrupt; repeated START signal generation; the ability to generate/recognize the acknowledge bit; and, bus busy detection.

The Serial I/O 76 includes a serial peripheral interface (SPI) module for full-duplex, synchronous, serial communication with peripheral devices. The SPI supports master and slave modes; separate transmit and receive registers; four selectable master mode frequencies where the maximum is equal to the frequency divided by 2; a separate ground clock for reduced RF interference; a serial clock with programmable polarity and phase; an end of transmission interrupt flag; a bus contention error flag; an overrun error flag; a programmable wired-OR mode; and, a transmit data register empty flag.

The microcontroller 74 uses a dual timer and a real time clock (RTC) that enables the system to control events by using a clock source to track and report time passage. The RTC contains a counter for maintaining a one second count derived from an external 32.768 Khz crystal source. Timing function software may write to or read this counter and use it to maintain a time stamp or time of day and calendar information. The counter maintains a unique count over a period of approximately 68 years. A software programmable alarm register may also be used to interrupt or wake-up the processor when the RTC counter reaches the alarm count. The RTC is implemented with logic circuits that consume very low power during switching and can be disabled by software when not required for use, thereby reducing power consumption.

The dual timer consists of two independent, identical, general purpose timers. Each general purpose timer block contains a free running 16-bit timer which can be used in various modes: to capture the timer value with an external event; to trigger an external event; to trigger an external event or interrupt when the timer reaches a set value; or, to count external events. Each timer has an eight-bit prescalar to allow programmable clock input frequency derived from the system clock (divided a 1 or 16) or external count input. The output pins (one per timer) have a variety of programmable modes and the output signal can be an active low pulse or a toggle of the current output. The dual timers include a maximum period of 16 seconds (at 16.67 MHZ); 60-ns resolution (at 16.67 MHz); programmable sources for the clock input, including an external clock; input capture capability with programmable trigger edge on input pins; two timers externally cascaded to form a 32-bit timer; and, free run and restart modes.

The controller 74 also supports on-chip memory to provide storage for critical instruction sequences, exception routines, stack space, and general data storage. The chip supports 128 Kb of configurable static random access memory (RAM) 78 and 264 Kb of configurable read only memory (ROM) 80. The register file supports 128 words in one-word increments and 128 bits in one-bit increments, simultaneous read and write, latched data outputs, separate read/write for each word and high speed.

The interrupt controller module provides interrupt requests and interrupt acknowledge signals. Each of these signals is generated by encoding or decoding the required processor signals. The interrupt controller supports interrupts from three sources: (1) an external, non-maskable interrupt, which always causes an interrupt priority level 7 request to the microprocessor core; (2) an external interrupt received through the 8-bit channel latched interrupt port (each channel can be programmed with an interrupt priority level, and each can have pending interrupts cleared independently from the others); and, (3) on-chip peripherals. The interrupt controller allows assignment of the interrupt priority level of each on-chip module and determination of a particular vector number to be presented when the module receives an interrupt acknowledge from the processor via the interrupt controller logic.

The core or central processing unit (CPU) 82 is the heart of the integrated circuit (IC). This unit 82 supervises system functions, makes decisions, manipulates data, and directs I/O functions. The microcontroller 74 of this application specific integrated circuit (ASIC) is a Motorola 020 core. The 020 core is a static implementation of the 68020 32-bit microprocessor. The core supports dynamic bus sizing from 8- to 16- to 32-bit data buses. It has a 256 byte on-chip instruction cache that speeds program execution. The 020 core also includes signals that permit easier interfacing between the core processor and the surrounding logic, as well as emulation support. Application specific logic is implemented using Motorola's HPF06 of CMOS standard cells.

An RS232 port 68 interfaces with the ASIC's I/O module 76 and is provided for data transfers and backup storage purposes. An electronic erasable programmable read only memory (EEPROM) 84 is provided to hold critical user files and configuration data when batteries are removed for extended periods of time. A capacitor can also be used to hold critical user files and configuration data for shorter periods of time.

Also connected to the ASIC's I/O module 76 are several user interface devices. A vibrator 86 supports message notification for other enabled individuals as well as users desiring silent notification. A piezo electric beeper 88 is included for audible notification. An LCD 60 is incorporated to display text and other symbolic functions when interacting with the device and system. A four-way switch 64 is provided for controlling cursor movement in the LCD 60, and left and right programmable select buttons 66 are provided to control the remote device 56, as discussed above.

A fully integrated reflective sensing module 62 connects to the ASIC's I/O module 76. The sensor 62 contains a 655 nm LED emitter and photo diode and generates a current as its output signal. A bifurcated aspheric lens is used to image the active areas of the emitter and detector to a single 4.27 mm (0.168 in.) spot. The detector is a PN photo diode. The LED cathode is physically and electrically connected to the case substrate or shell 58 of the remote device or sensor 56. The resolution of the sensor 56 is 0.19 mm (0.007 in.) at 655 nm red light. Infrared light provides greater resolution, but is not used for ergonomic reasons, i.e., people prefer to visually verify the bar-code scan. The sensor 56 is contained in an 8 pin TO-5 metal can with a glass window. The LED and photo diode are mounted on a header at the base of the package. Positioned above these active elements is a bifurcated aspheric lens that focuses them to the same point. The sensor 56 can be rigidly secured by commercially available TO-5 style heat sink or an 8 pin 0.200 inch diameter pin circle socket. This provides a stable reference platform for affixing the sensor 56 to a circuit board. A protective sapphire ball focusing tip could also be incorporated into the unit. The sensor 56 is characterized for use with the digitizer logic of the ASIC.

A second embodiment of the remote device 56' of the electronic system for purchasing an item is shown in FIG. 4. The remote device 56' is in the form of an FM/AM two-way narrowband PCS pager with bar-code scanner. Remote device 56' includes stereo headphones 90' plugged into the stereo mini-jack 92' of the remote device or unit 56'. In all other respects, the remote devices 56 and 56' are the same; thus, the same numerical designations are used for corresponding parts.

FIG. 5 is a schematic drawing of the remote device 56' of FIG. 4 representing the internal electrical function diagram flow of the remote device 56'. A second receiver and decoder assembly 96', including a second antenna 98', is incorporated for FM and/or AM radio reception. This unit 56' is a complete FM and/or AM radio on an IC chip such as those manufactured by Philips Semiconductors and NEC. These units 56' include the entire radio with an on-chip aerial input (antenna 98') and audio output. Operating over an extended range from 80 to 130 MHz, they offer several improvements over conventional FM radio systems besides a smaller size, less costs, lower voltages and cleaner signals. Tracking and distortion problems are eliminated because, in some chips, only a local oscillator needs to be tuned. Other units include a phased locked loop (PLL) frequency synthesizer in which the phase difference between an externally input frequency and reference frequency is detected and a loop (closed circuit) is configured to negate the phase difference to stabilize the frequency of the output signal. Many units offer reduced electromagnetic interference (EMI) noise that can affect external circuits. Some units include on-chip analog to digital converters (ADC) 100' and digital to analog converters (DAC) 102', however, at a low 8-bit and 9-bit resolution. Some of the chips include large capacity RAM 78' to meet applications for radio data systems (RDS). RDS is a system in which digital signals are added to the FM radio wave to transmit program and other information data to users. This data can be sent to the microcontroller 74' for PCS applications and the PIPFS.

Various configurations of the remote unit 56' are possible. For example, the pager 56' can be configured with an FM stereo chip (not shown) or an FM/AM chip 104'. It may or may not include ADC's 100' and DAC's 102'; hence, the audio output signal may be connected directly to the amplifiers 106' and stereo mini phono jack 92', or the audio output signal may be connected to the I/O 76' of the microcontroller 74'. In the latter, the CPU 82 is either a digital signal processor (DSP) or a reduced instruction set computing (RISC) processor, and the on-chip ADC 100' and DAC 102' are of 8- or 16-bit resolution. The FM/AM stereo chip 104' can be included in the ASIC design, thus reducing the number of components and the manufacturing costs.

The transmitter/receiver unit 70' and FM radio chip/receiver unit 96' interface with the bus module in the Serial I/O portion 76' of the microcontroller 74'. Depending on the configuration of the FM/AM stereo chip 104', a different I/O interface 76' may be required on the microcontroller 74'. If the chip 104' is not built into the microcontroller 74' and its audio output bypasses the controller 74', then no change is required. If the chip 104' is built into the ASIC (with DSP) design, or sends its audio output to the DSP microcontroller 74', then a new interface is required. The system would then use a dual universal asynchronous receiver/transmitter (DUART) (not shown). The DUART module is a configurable module that contains internal control logic, timing and baud rate generator logic, interrupt control logic, and supports up to 8 serial communication channels. The serial port can sustain data rates of 14.7 Mb/s. The DUART supports full duplex asynchronous/synchronous receiver/transmitter channels; a maximum data transfer of 1x clock (14.7 Mb/s), 16x clock (922 Kb/s); configurable FIFO depth up to 16 on receiver and transmitter; a programmable baud rate for serial channel; programmable data format; a programmable channel mode for diagnostics; automatic wake-up modes for multi-drop applications; single output, interrupt output and vector interrupt output; parity, framing, and overrun error detection; false start bit detection; line break detection and generation; detection of breaks generated in the middle of a character; and, interrupt or poll on start/stop break. The DUART can also support digital audio broadcasts (DAB) once a specification is approved by the FCC.

As noted earlier, depending on the FM/AM stereo chip configuration, the CPU 82' will either be the Motorola 020 core, 030 core, DSP, or PowerPC core. A low-cost RISC processor with DSP functions can also be used. A new ASIC with the DSP can be incorporated and produced in anticipation of FCC approval of an in-band on-line channel (IBOC) or an in-band adjacent channel (IBAC) DAB specification. In such a situation, the lowcost RISC processor with DSP functions should be a 32-bit processor core which operates from 0 to 60 MHz. The RISC processor should also support load scheduling, million instructions per second (MIPS) RISC II Instruction Set Architecture (ISA), a pipelined 32-bit multiplier with two cycle latency, and pipelined multiply add and subtract functions. The RISC processor should extract 32-bits from 64-bit multiply results; be capable of single cycle conversion between integers of various sizes (saturate); have a 1 Kb direct mapped instruction cache; have a 4 Kb direct mapped data cache; have a reset handler with internal power on reset generation; have external asynchronous reset input; have core self and system reset; and, have synchronous system reset output.

Figure 6:
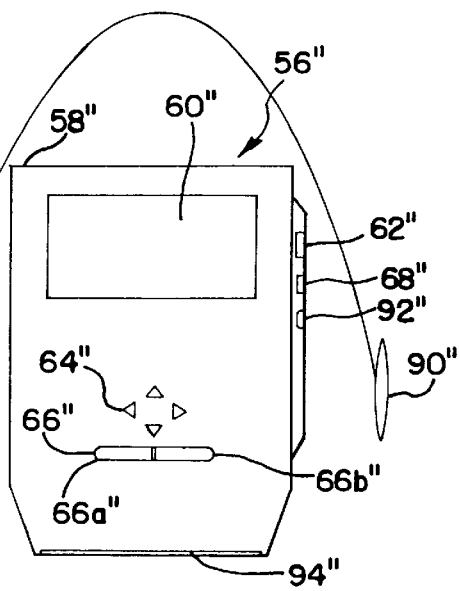
FIG. 6 is a front elevation view of a third embodiment of a remote device.
Figure 7:
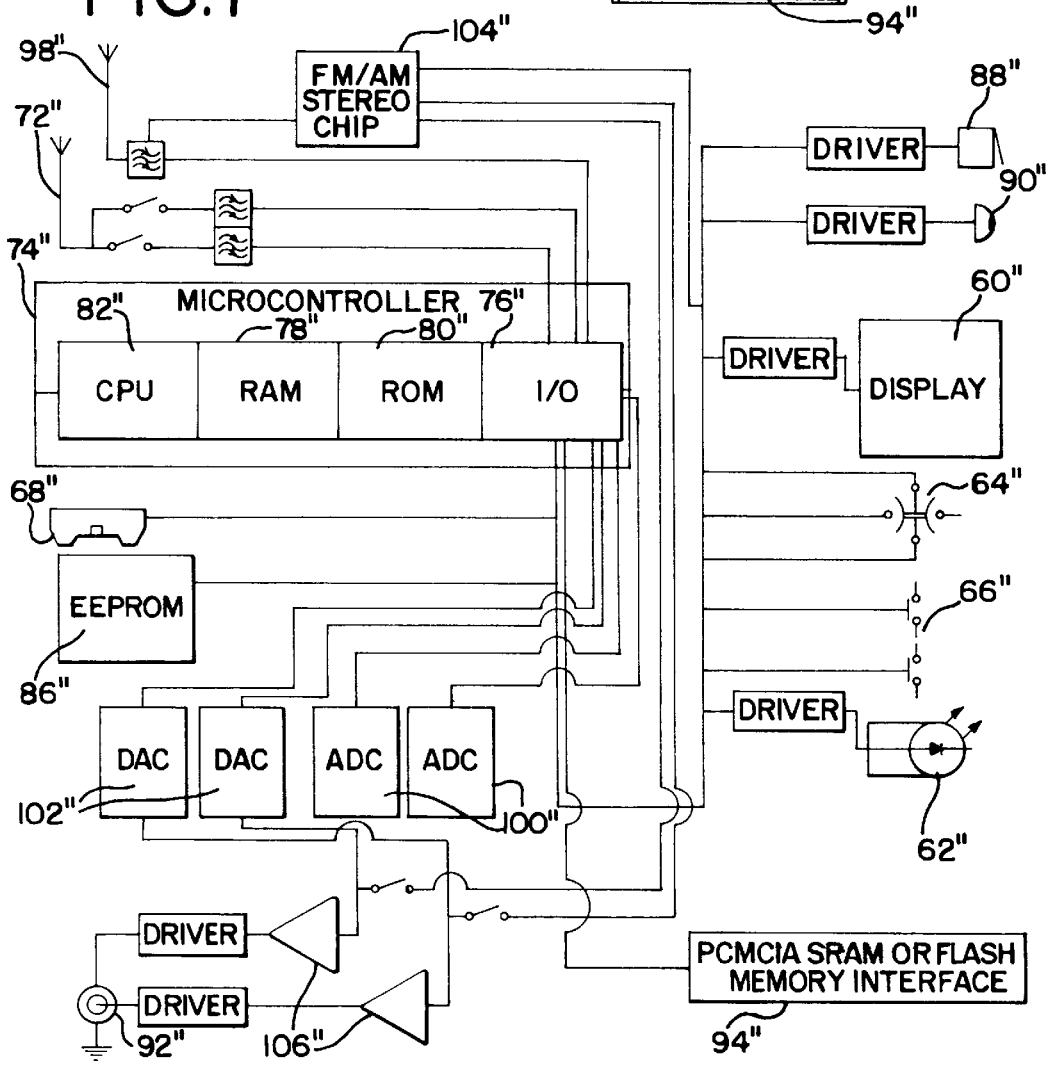
FIG. 7 is a schematic drawing of the remote device of FIG. 6.

A third embodiment of the remote device 56" of the electronic system for purchasing an item is shown in FIGS. 6 and 7. Remote device 56" includes a PCMCIA slot 94" connecting to the ASIC's I/O module 76" to download music (compressed digital audio or DAB data) from the radio signal to store onto the RAM 78" for consumer evaluation or purchase of audio tracks. The PCMCIA slot 94 may also be used to connect a sound card, memory devices, modems, etc. onto the remote device 56" or to facilitate transmission of electronic currency or the use of electronic debit and credit cards. If a PCMCIA interface connects to the ASIC's I/O module for download of compressed digital audio, then the CPU 82 must be either a RISC or a DSP.

A fourth embodiment of the remote device 56''' of the electronic system for purchasing an item is shown in FIGS. 8 and 9. The remote device 56''' is in the form of a DAB/FM radio two-way narrowband PCS pager with bar-code scanner. The remote device 56''' can be configured with only an FM stereo chip (not shown) or an FM/AM chip 104'''. The audio output is sent to the ADC's 100''' on the microcontroller 74. A RISC/DSP is used, along with on-chip ADC's 100''' and DAC's 102''' of 16-bit resolution. The FM/AM stereo chip 104''' can be included in the ASIC design, thus reducing components and manufacturing costs. Finally, the remote device 56" can be manufactured with or without the bar-code scanner assembly and logic 62'''. In either case, the DAC's 102' are included on-chip and output to the stereo mini jack assembly 108'

The microcontroller 74''' of this ASIC can be a Motorola DSP or PowerPC core. A low-cost RISC processor with DSP functions can also be used.

Figure 10:
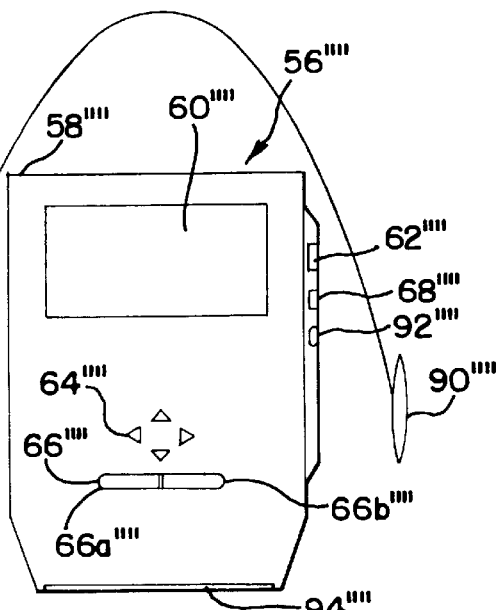
FIG. 10 is a front elevation view of a fifth embodiment of a remote device.
Figure 11:
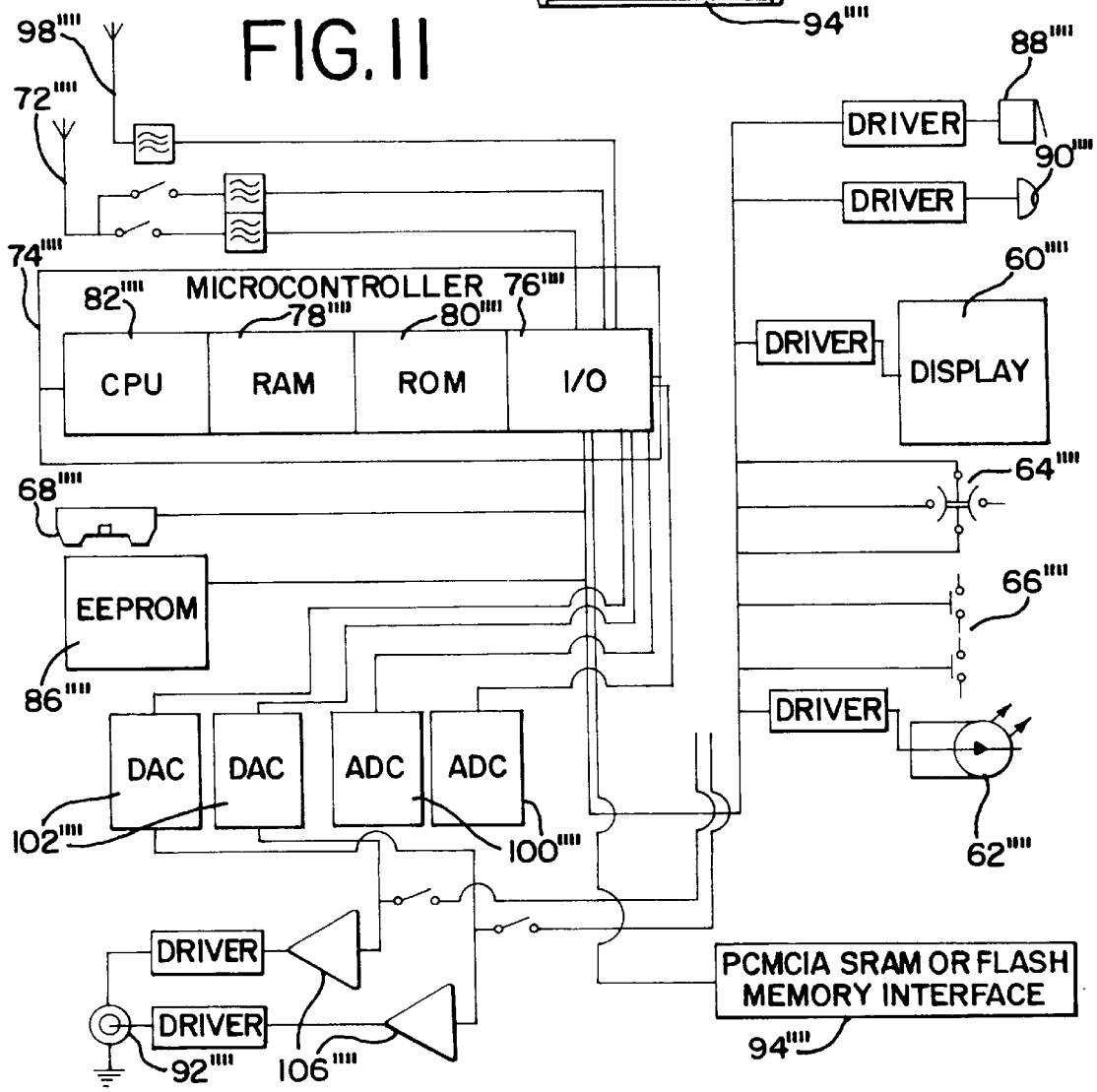
FIG. 11 is a schematic drawing of the remote device of FIG. 10.

A fifth embodiment of the remote device 56"" of the electronic system for purchasing an item, shown in FIGS. 10 and 11, has all of the same components as the fourth embodiment shown in FIGS. 8 and 9; however, the fifth embodiment includes a PCMCIA interface 94"" connected to the ASIC's I/O module to download compressed digital audio or DAB data for consumer evaluation or purchase of audio tracks.

FIG. 12 is a front elevation view of a sixth embodiment of a remote device of the electronic system for purchasing an item. The remote device includes a conventional two-way pager 108 and an adjunct bar-code scanner 110. The pager 108 components are encased in a shock resistant durable ceramic or plastic shell 112. Messages, menus, commands, files, and configuration settings are viewed in the LCD 114 of the pager 108. A four-way switch 116 is used for controlling cursor movement in the LCD 114. Left and right programmable select buttons—118 are used to control the pager 108. As in the remote devices described above, one button 118a controls menu, file, message, command and alphanumeric input selections while the other button 118b functions as an escape mechanism. Both buttons can be programmed to perform either function.

The adjunct bar-code scanner 110 includes an adjunct reflective sensing module 120 which, similar to the remote devices described above, connects to an ASIC's I/O module. The adjunct bar-code scanner 110 consists of a decoder chip 122 and an 8-bit microprocessor 124. In another embodiment of the adjunct bar-code scanner 110', the decoder chip 122 and the 8-bit microprocessor 124 are combined into one ASIC 126. Bar-code information is scanned using an adjunct reflective sensing module 120 similar to the one described above. An RS232 connection is supplied to support data transfer and back-up storage option. A female RS232 connection 128 is supplied which mates with the male RS232 connection 130 on the pager 108 to support data transfer from the adjunct device.

FIG. 13 is a front elevation view of a seventh embodiment of a remote device of the electronic system for purchasing an item. The remote device includes a conventional two-way pager 108' and an adjunct bar-code scanner 110'. The adjunct device 110' is a standalone (flat surface) unit which connects by a RS232 cable 132 to a variety of remote devices or pagers 108'—. In all other respects, the adjunct devices 110 and 110' are the same.

While specific embodiments have been illustrated and described, numerous modifications come to mind without significantly departing from the spirit of the invention and the scope of protection is only limited by the scope of the accompanying claims.

I claim:

1. A remote device for an electronic system for purchasing a tangible item from at least one home station comprising:
    a two-way pager having first receiving means for receiving a message, first transmitting means for transmitting a response to the message, alarm means for acknowledging the receipt of the message and means for displaying the message; and,
    means for entering an item code into the remote device representing the tangible item, said entering means comprising;
        a light emitting diode emitter;
        a detector physically and electronically connected to the emitter; and,
        a bifurcated aspheric lens to focus the emitter and the detector to a single spot.

2. The remote device of claim 1 further comprising a microcontroller within the remote device to control the remote device, wherein the microcontroller comprises:
    a central processing unit;
    random access memory; and,
    read only memory.

3. The remote device of claim 2 further comprising a PCMCIA slot with an interface connected to the microcontroller.

* * * * *